United States Patent Office 2,973,369
Patented Feb. 28, 1961

2,973,369

3,3-DICHLORO-ISOINDOLINONES

Andre Pugin, Basel, Switzerland, assignor to J. R. Geigy A.-G., Basel, Switzerland No Drawing. Filed Oct. 24, 1958, Ser. No. 769,310

Claims priority, application Switzerland Dec. 10, 1957

7 Claims. (Cl. 260—325)

The object of this invention is to provide a process of manufacture of easily condensable isoindoline-1-ones of pure state and in good yields from easily accessible starting materials. The further objects of this invention are the new, easily condensable 3.3-dichloro-isoindolinones so produced.

My method starts with 1.3.3-trihalogeno-isoindolenines which are easily prepared by a known process by treating phthalic acid imides with two molar proportions of phosphorus pentachloride in inert organic solvents. For instance, tetrahalogeno phthalic acid imide is reacted with excess phosphorus pentachloride to yield a 1.3.3. 4.5.6.7-heptahalogeno-isoindolenine. It has been found that negatively substituted 1.3.3-trichloro-isoindolenines are easily transformed by substantially one equivalent proportion of a non-metallic hydroxy compound R—OH in inert organic solvents to 3.3-dihalogeno-isoindoline-1-ones while splitting off R-halogen:

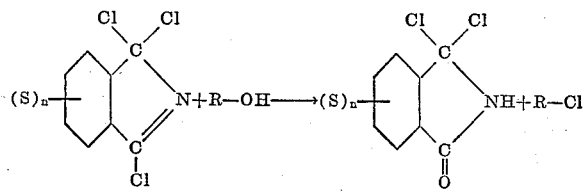

In these formulae S means any inert negative substituent, $n$ means a whole number from 1 to 4, and R means hydrogen, the organic radical of an alcohol or of a carboxylic acid, thus hydrogen, aliphatic, araliphatic, cycloaliphatic, alkanoyl and aroyl radicals.

Valuable azomethine dyes are obtained for example from my new materials wherein S means halogen such as fluorine or bromine and preferably chlorine and $n$ means 4 as described below. The invention is not restricted however, to the manufacture of these specific compounds. Other possible negative substituents represented by S in the above formulae are e.g. perfluorated alkyl groups such as trifluoromethyl, nitro, acyl, alkyl- and aryl-sulphonyl, carboxylic acid ester and sulphonic acid amide groups organically substituted at the nitrogen atom. Lower alcohols such as for example methanol, ethanol, propanol, butanol, 2-methoxy- or ethoxy- or butoxy-ethanol are the preferred hydroxy compounds R—OH. Equivalent amounts of polyalcohols may also be used, e.g. 1.2-dihydroxyethane, 1.2- or 1.3-dihydroxypropane, 1.2-, 1.4- or 2.3-dihydroxybutane. Also cycloaliphatic alcohols such as cyclohexanol, araliphatic alcohols such as benzyl alcohol and higher fatty alcohols such as dodecanol, hexadecanol, octadecanol can be used. If water is used as the hydroxy compound R—OH, the reaction is advantageously performed in the presence of an inert hydrophilic organic solvent as e.g. in aliphatic or saturated cyclic ethers or ketones. Fatty as well as aromatic carboxylic acids can be used as hydroxy compounds R—OH whereby carboxylic acid halides are formed as by-products. Acetic acid, propionic acid, chloroacetic acid, phenylacetic acids, cinnamic acid, benzoic acid, chlorobenzoic acids can be used for example. Kerosines of boiling points from 50 up to 250° C., cycloalkanes such as cyclohexane, decahydronaphthalene, aromatic hydrocarbons such as benzene, diphenyl, toluene, xylenes, halogenated hydrocarbons such as chloroform, tetrachlorethane, o-dichlorobenzene, nitrohydrocarbons such as nitrobenzene, nitrotoluenes, ethers such as dibutyl ether, ethylene glycol dimethyl, diethyl and dibutyl ethers, dioxan or tetrahydrofurane, ketones such as acetone, methylethyl ketone, cyclohexanone can be used as inert organic solvents. The reaction of the 1.3.3-trihalogeno-isoindolenines with the hydroxy compound R—OH is performed at low temperatures, preferably at room temperature. Dependent on the reactivity of the components used, higher temperatures may be necessary to accomplish the transformation in reasonable reaction times; for instance if tertiary alcohols are used, temperatures of from 50 to 100° C. may be of advantage. The desired 3.3-dihalogeno-isoindoline-1-ones generally crystallise from the reaction mixtures in pure state and the very good yields often surpass 90% of the theoretical amount. This new process is especially suitable for the production of benzo-tetrahalogenated isoindoline-1-ones containing in 3-position two easily exchangeable chlorine atoms. The 3.3-dichloro-isoindoline-1-ones may be reacted direct with equivalent amounts of aromatic polyamines to form valuable azomethine dyes. It may be of advantage however, to first react them with ammonia, organic primary or secondary amines to form the corresponding 3-imino- or 3.3-ditertiary amino compounds which easily condense with polyprimary amino compounds to form the desired azomethine dyes. Aliphatic, araliphatic, cycloaliphatic and aromatic-isocyclic primary amines and aliphatic, araliphatic, alicyclic, isocyclic-aromatic aliphatic and heterocyclic secondary amines such as piperidine and morpholine may be used. The new process is especially adapted for the production of pure 4.5.6.7-tetrachloro-3-imino-isoindoline-1-one in good yields and grade of purity and therefrom the new and most valuable azomethine dyes of the isoindoline-1-one series described in my copending application Serial No. 704.907, filed December 24, 1957, of which the instant application is a continuation-in-part.

In my new compounds corresponding to the general formula:

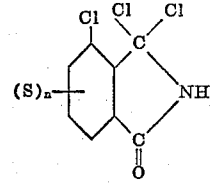

the inert negative substituent S may be halogen, such as preferably chlorine if $n$ is four, fluorine or bromine, nitro, alkyl sulphonyl, possibly also aryl sulphonyl, sulphonic acid amide, carbacyl such as alkyl carbonyl and aryl carbonyl, and carbalkoxy.

As is apparent from the preceding description, the preferred object of the present invention is the compound of the formula

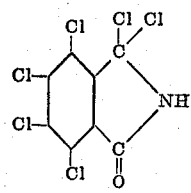

The following examples illustrate the invention.

Where not otherwise stated, parts are given as parts by weight. The temperatures are in degrees centigrade.

Example 1

A mixture of 1.8 parts of water and 10 parts of dioxan is added dropwise within 10 minutes at 20–25° to a solution of 35.8 parts of 1.3.3.4.5.6.7-heptachloro-isoindolenine in 200 parts of dioxan. After stirring for 10 hours, 3.3.4.5.6.7-hexachloro-isoindoline-1-one separates in the form of a white precipitate. After isolating and recrystallising from benzene, white crystals are formed which melt at 210° on decomposition.

$C_8HONCl_6$: Cl calculated 62.6%, found 62.06%. N calculated 4.10%, found 4.32%.

The 1.3.3.4.5.6.7-heptachloro-isoindolenine is produced from tetrachlorophthalimide and 2 mols of phosphorus pentachloride in o-dichlorobenzene at 100°.

Example 2

4.6 parts of abs. ethyl alcohol mixed with 20 parts of o-dichlorobenzene are added dropwise within 10 minutes at 20–25° to a solution of 35.8 parts of 1.3.3.4.5.6.7-heptachloro-isoindolenine in 200 parts of o-dichlorobenzene. A white precipitate is soon formed. After stirring for 20 hours, the precipitate is filtered off and washed with petroleum ether. The white product is identical to that of Example 1 and melts at 210° on decomposition. With 4.4'-diaminodiphenyl in o-dichlorobenzene, the orange, difficultly soluble, fast to light pigment is formed.

Similarly good results are attained if the ethyl alcohol is replaced by 3.2 parts of methyl alcohol or 13 parts of n-octyl alcohol or 10.4 parts of benzyl alcohol or 6 parts of isopropyl alcohol.

Example 3

142 parts of finely pulverised 1.3.3.4.5.6.7-heptachloro-isoindolenine are pasted in 500 parts of a petroleum fraction boiling from 180–250°. A solution of 40 parts of cyclohexanol in 80 parts of the same petroleum fraction is added dropwise to this suspension at 20–23° within 30 minutes while stirring. After stirring for 20 hours at 20–23°, the white precipitate is filtered off, washed with petroleum ether and dried for a short time at 50° under 20 mm. Hg. 126 parts of pure 3.3.4.5.6.7-hexachloro-isoindoline-1-one are so obtained.

This substance is obtained in the same good yield and purity if, in this example, the cyclohexanol is replaced by 52 parts of n-octyl alcohol or 108 parts of stearyl alcohol.

Example 4

7.4 parts of tert. butyl alcohol are added to a suspension of 35.8 parts of 1.3.3.4.5.6.7-heptachloro-isoindolenine in 200 parts of a petroleum fraction boiling at 180–250°. The whole is then stirred for 24 hours at 50° and for 12 hours at 70°. After cooling to 20°, 20 parts of pure 3.3.4.5.6.7-hexachloro-isoindoline-1-one are isolated by filtration. The petroleum solution still contains heptachloro-isoindolenine.

If, in this example, the tert. butyl alcohol is replaced by 8.8 parts of tert. amyl alcohol, the same result is obtained.

Example 5

3 parts of acetic acid are added to a solution of 17.9 parts of 1.3.3.4.5.6.7-heptachloro-isoindolenine in 100 parts of o-dichlorobenzene. After stirring for 20 hours at room temperature the white precipitate formed is filtered off and washed with petroleum ether. It melts on decomposition at 210° and is pure 3.3.4.5.6.7-hexachloro-isoindoline-1-one.

Instead of acetic acid, also 4.4 parts of butyric acid or 4.8 parts of chloracetic acid or 10.1 parts of lauric acid can be used.

Example 6

A solution of 6.1 parts of benzoic acid in 200 parts of ligroin is added to a suspension of 18 parts of 1.3.3.4.5.6.7-heptachloro-isoindolenine in 200 parts of ligroin. After stirring for 100 hours at 25–30°, 10.2 parts of pure 3.3.4.5.6.7-hexachloro-isoindoline-1-one are isolated by filtration.

Instead of benzoic acid also 7.3 parts of o- or p-chlorobenzoic acid or 8.3 parts of m- or p-nitrobenzoic acid can be used.

Example 7

A mixture of 1 part of cyclohexanol and 5 parts of cyclohexane is added dropwise at 20° to a solution of 2.9 parts of 1.3.3.4.7-pentachloro-isoindolenine in 100 parts of cyclohexane. After stirring for 20 hours at 20–23°, the white precipitate formed is filtered off and washed with petroleum ether. After drying for a short time, the product obtained melts at 160–170° on decomposition. On recrystallising from a mixture of cyclohexane and chlorobenzene, white crystals are obtained which melt at 172–173° on decomposition. According to analysis and chemical behaviour, the product is 3.3.4.7-tetrachloro-isoindoline-1-one. Heated with 1.4-diaminobenzene or with 4.4'-diaminodiphenyl in nitrobenzene, it forms yellow, fast to light pigments which are suitable for the dyeing of alkyd resins.

The 1.3.3.4.7-pentachloro-isoindolenine (B.P.$_{10}$ 185–186°) is obtained by reacting 3.6-dichlorophthalimide with 2 mols of phosphorus pentachloride in o-dichlorobenzene at 100°.

Example 8

A mixture of 5 parts of cyclohexanol and 20 parts of ligroin is added dropwise at 20–25° to a solution of 13.3 parts of a mixture of 5-nitro- and 6-nitro-1.3.3-trichloro-isoindolenine in 250 parts of ligroin. After stirring for 10 hours at room temperature, the precipitate formed is filtered off and washed with petroleum ether. The grey coloured product melts on decomposition at 115–116° and, according to analysis and chemical behaviour, is 5- or 6-nitro-3.3-dichloro-isoindoline-1-one.

The same product is obtained if in this example the cyclohexanol is replaced by 7.9 parts of n-decyl alcohol.

Heated in o-dichlorobenzene with 4.4'-diamino-3.3'-dimethyldiphenyl, the 5- or 6-nitro-3.3-dichloro-isoindoline-1-one forms a red pigment which can be used for the dyeing of lacquers.

Example 9

10 parts of cyclohexanol are added to a solution of 29.85 parts of 5- or 6-methylsulphonyl-1.3.3-trichloro-isoindolenine in 150 parts of o-dichlorobenzene at 20–25°. After 10 minutes, a white precipitate forms which is filtered off after stirring for 20 hours and is washed with petroleum ether. 20 parts of a white product, 5- or 6-methyl sulphonyl-3.3-dichloro-isoindoline-1-one, are obtained in this way. It decomposes at temperatures higher than 160°. Heated in o-dichlorobenzene with 4.4'-diaminodiphenyl, it forms a yellow pigment and heated with 4.4'-diamino-3.3'-dimethoxydiphenyl in o-dichlorobenzene it forms an orange pigment. Both pigments are suitable for the dyeing of graphic colours.

The 5- or 6-methyl sulphonyl-1.3.3-trichloro-isoindolenine used in this example is produced by heating 4-methyl sulphonyl phthalimide (M.P. 263–264°) with 2.2 mols of phosphorus pentachloride in o-dichlorobenzene for 5 hours at 110–115°.

Having now fully explained my invention and how the same is to be carried out, what I claim is:

1. A compound of the formula

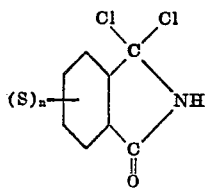

wherein
S represents a member selected from the group consisting of halogen, nitro and alkylsulphonyl, and
n represents a whole number from 1 to 4 inclusive.

2. The compound of the formula

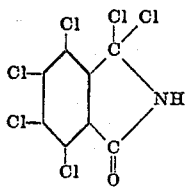

3. The compound of the formula

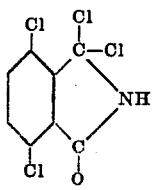

4. The compound of the formula

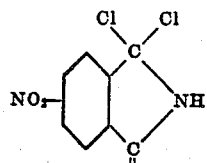

5. The compound of the formula

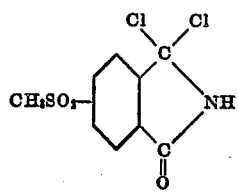

6. A process for the manufacture of an easily condensable isoindoline-1-one of the general formula

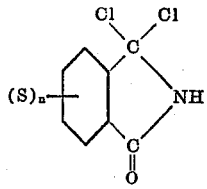

wherein
S represents a member selected from the group consisting of halogen, nitro and alkylsulphonyl, and
n represents a whole number from 1 to 4 inclusive, by treating in an inert organic solvent a corresponding 1.3.3-trichloro-isoindolenine compound with substantially an equimolar proportion of a hydroxy compound selected from the group consisting of water, alcohol and carboxylic acid.

7. A process for the manufacture of an easily condensable isoindoline-1-one compound of the formula

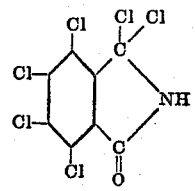

by treating in an inert organic solvent, 1.3.3.4.5.6.7-heptachloroisoindolenine with substantially an equimolar proportion of a hydroxy compound selected from the group consisting of water, alcohol and carboxylic acid.

References Cited in the file of this patent

UNITED STATES PATENTS

| | | |
|---|---|---|
| 1,908,705 | Jaeger | May 16, 1933 |
| 2,537,352 | Jones | Jan. 9, 1951 |
| 2,692,267 | Campbell | Oct. 19, 1954 |
| 2,701,252 | Vollman | Feb. 1, 1955 |

OTHER REFERENCES

Ind. & Eng. Chem. vol. 39, #11, page 1420 (1947).
Dunet et al.: Compt. Rend., vol. 226, pp. 822–3 (1948).